June 5, 1923.
H. LEITNER
1,457,844
PRODUCTION OF METAL AIRSCREWS OR PROPELLERS
Filed Jan. 16, 1922
Fig. 1.
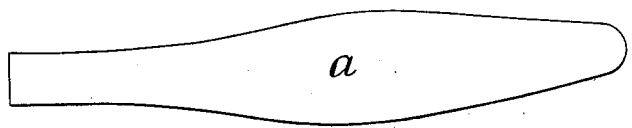
Fig. 2.
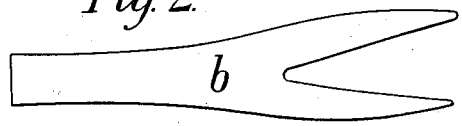
Fig. 3.
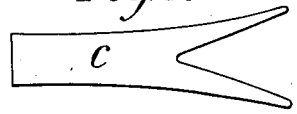
Fig. 4.
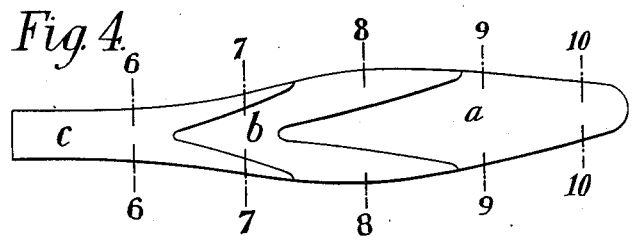
Fig. 5.
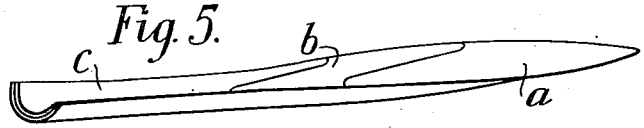
Fig. 6. Fig. 7. Fig. 8. Fig. 9. Fig. 10.
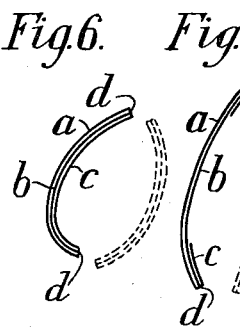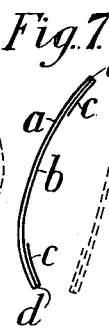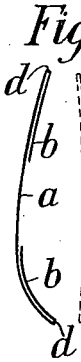
Inventor
Henry Leitner,
By George A. Prevost
Atty.

Patented June 5, 1923.

1,457,844

UNITED STATES PATENT OFFICE.

HENRY LEITNER, OF LONDON, ENGLAND.

PRODUCTION OF METAL AIRSCREWS OR PROPELLERS.

Application filed January 16, 1922. Serial No. 529,761.

*To all whom it may concern:*

Be it known that I, HENRY LEITNER, a subject of the King of Great Britain, residing at Regent House, Kingsway, London, England, have invented new and useful Improvements in the Production of Metal Airscrews or Propellers, of which the following is a specification.

This invention relates to a novel, effective and economical method of manufacturing metal airscrews or propellers of the kind comprising hollow blades each of which consists of an outer sheath strengthened with internal laminations.

According to the invention I first cut out the outer sheath or sheet and the laminations for each half blade and then weld the said sheet and laminations of each half blade together at the edges while still flat. The sheet and laminations thus welded are then raised to a temperature of say 850° C., and, while still hot, are pressed between dies to impart to them the required curvature. The dies are in practice, "stepped" in order to conform to the contour of the laminations.

The heating of the half blade not only enables it to be shaped in the dies but also normalizes the weld between the outer sheet and the laminations.

The half blades produced as above described are secured together to form a complete blade in the ordinary way.

To enable the invention to be fully understood I will describe it by reference to the accompanying drawing, in which:—

Figures 1, 2 and 3 are, respectively, plan views of the flat blanks for forming the outer sheath or sheet and two inner laminations of one half of a propeller blade made in accordance with the invention.

Figure 4 is a similar view showing the said three blanks superposed in their proper relative positions to be welded at their edges to form the half blade, and Figure 5 is a perspective view showing the said three blanks after being pressed between dies to the required curvature.

Figures 6, 7, 8, 9 and 10 are sections drawn to a larger scale of the half blade when pressed, the sections being taken on the lines 6—6, 7—7, 8—8, 9—9 and 10—10 respectively, Figure 4.

*a, b, c* Figures 1 to 4 inclusive indicate respectively, the flat blanks of the outer sheet, the intermediate lamina and the inner lamina of the half propeller blade, the said parts being superposed, as indicated in the latter figure, and welded or otherwise secured together at their edges, as at *d* Figures 6 to 8. The half blade is then preferably raised to a temperature of, say, 850° C., and while hot, pressed between dies to impart to the several layers the required curvature, that form necessary for the back of the blade being shown in full lines Figures 6 to 10, whilst that required for the front or face of the blade is indicated by the dotted sections in Figures 6 to 10.

The half blades indicated respectively by the full lines and dotted lines in Figures 6 to 10 are then secured together to form the complete blade in the ordinary way.

Claim:

A method of constructing the hollow blades of metal air-screws or propellers of the kind hereinbefore referred to consisting in first cutting the outer sheath or sheet and the laminations for each half blade from flat sheet metal, then welding such outer sheet and laminations together at the edges, then subjecting such welded sheets to a temperature to enable them to be pressed between dies to the required curvature and finally securing the half blades together at their edges, substantially as described.

HENRY LEITNER.